(12) United States Patent
Kim

(10) Patent No.: US 12,497,093 B2
(45) Date of Patent: Dec. 16, 2025

(54) STEER BY WIRE TYPE STEERING APPARATUS

(71) Applicant: HL MANDO CORPORATION, Gyeonggi-do (KR)

(72) Inventor: HoSik Kim, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 528 days.

(21) Appl. No.: 17/989,586

(22) Filed: Nov. 17, 2022

(65) Prior Publication Data

US 2023/0159084 A1 May 25, 2023

(30) Foreign Application Priority Data

Nov. 19, 2021 (KR) .................. 10-2021-0160395

(51) Int. Cl.
*B62D 5/00* (2006.01)
*B62D 1/16* (2006.01)
*F16H 7/08* (2006.01)
*F16H 7/18* (2006.01)

(52) U.S. Cl.
CPC ............ *B62D 5/006* (2013.01); *B62D 1/163* (2013.01); *F16H 7/08* (2013.01); *F16H 2007/185* (2013.01)

(58) Field of Classification Search
CPC ........ B62D 1/163; B62D 5/001; B62D 5/006; B62D 5/0409; F16H 2007/185; F16H 7/18; F16H 7/02; F16H 7/08; F16H 7/22
See application file for complete search history.

(56) References Cited

U.S. PATENT DOCUMENTS 4,808,148 A 2/1989 Holtz
6,464,604 B1 10/2002 Frankowski et al.
(Continued)

FOREIGN PATENT DOCUMENTS

DE  690 27 943 T2  1/1997
DE  10 2018 130 656 A1  6/2019
(Continued)

OTHER PUBLICATIONS

Office Action dated Dec. 18, 2024 for German Patent Application No. 10 2022 212 062.0 and its English translation by Google Translate.
(Continued)

*Primary Examiner* — Bobby Rushing, Jr.
(74) *Attorney, Agent, or Firm* — WOMBLE BOND DICKINSON (US) LLP

(57) ABSTRACT

A steer by wire type steering apparatus according to the embodiments of the present disclosure comprises a steering shaft coupled to a steering wheel to rotate, a steering sensor for detecting a rotation direction of the steering shaft, an electronic controller for operating a steering motor in forward and reverse directions according to the rotation direction sensed by the steering sensor, a first pulley provided on a shaft of the steering motor, a second pulley provided on the steering shaft, a driving belt coupled to the first pulley and the second pulley, and a belt support member that rotationally supports one side of the driving belt and is coupled to a reduction gear housing.

11 Claims, 11 Drawing Sheets

(56) References Cited

U.S. PATENT DOCUMENTS

| | | | |
|---|---|---|---|
| 7,758,459 B2* | 7/2010 | Gaborel | F16H 55/54 |
| | | | 474/178 |
| 9,802,641 B2* | 10/2017 | Tomikawa | B62D 5/0448 |
| 10,160,480 B2* | 12/2018 | Pattok | F16H 7/02 |
| 10,661,823 B2* | 5/2020 | Delmarco | B62D 5/005 |
| 2004/0009837 A1* | 1/2004 | Serkh | F16C 23/10 |
| | | | 474/135 |
| 2008/0167150 A1 | 7/2008 | Gaborel et al. | |
| 2017/0225705 A1* | 8/2017 | Tomikawa | F16H 7/023 |
| 2018/0119790 A1 | 5/2018 | Kanduri et al. | |
| 2019/0118853 A1 | 4/2019 | Delmarco et al. | |

FOREIGN PATENT DOCUMENTS

| | | | | |
|---|---|---|---|---|
| DE | 10 2020 206 359 A1 | 12/2020 | | |
| JP | 2012-153270 A | 8/2012 | | |
| KR | 20120069933 A | * 6/2012 | | B62D 6/10 |

OTHER PUBLICATIONS

Office Action dated Sep. 15, 2025 for Korean Patent Application No. 10-2021-0160395 and its English translation provided by Applicant's foreign counsel.

* cited by examiner

STEER BY WIRE TYPE STEERING APPARATUS

CROSS REFERENCE TO RELATED APPLICATION

This application claims the benefit and priority from Korean Patent Application No. 10-2021-0160395, filed in the Republic of Korea on Nov. 19, 2021, the entire contents of which are hereby incorporated by reference for all purposes as if fully set forth into the present application.

BACKGROUND

Field of the Disclosure

Embodiments of the present disclosure relate to a steer by wire type steering apparatus.

Description of the Related Art

In general, power steering has been developed and applied to a vehicle steering apparatus to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the vehicle wheel, the Steer By Wire (SBW) type steering apparatus for steering a vehicle using an electric motor has been developed and applied.

However, in the case of such a steer by wire type steering system, since there is no mechanical connection between the steering shaft and the vehicle wheels, the driver's steering wheel rotation can rotate indefinitely, thereby reducing the driver's steering feeling and steering stability.

In addition, in the steer by wire type steering system, the need for a steer by wire type steering apparatus that can provide an accurate and continuous reaction force to the driver is emerging in order to provide an accurate sense of reaction force to the driver and to maintain a constant sense of reaction force transmitted to the steering wheel even when a high load is transmitted to the reduction gear that reduces the rotation speed of the motor.

SUMMARY OF THE DISCLOSURE

Embodiments of the present disclosure provide a steer by wire type steering apparatus capable of providing an accurate feeling of reaction force to the driver and maintain a constant feeling of reaction force transmitted to the steering wheel even when a high load is transmitted to the reduction gear.

In addition, the purpose of the embodiments of the present disclosure are not limited thereto, and other objects not mentioned will be clearly understood by those skilled in the art from the following description.

A steer by wire type steering apparatus according to the embodiments of the present disclosure may comprise a steering shaft coupled to a steering wheel to rotate, a steering sensor for detecting a rotation direction of the steering shaft, an electronic controller for operating a steering motor in forward and reverse directions according to the rotation direction sensed by the steering sensor, a first pulley provided on a shaft of the steering motor, a second pulley provided on the steering shaft, a driving belt coupled to the first pulley and the second pulley, and a belt support member that rotationally supports one side of the driving belt and is coupled to a reduction gear housing.

According to the embodiments of the present disclosure, there is provided a steer by wire type steering apparatus that provide an accurate feeling of reaction force to the driver, and even if a high load is transmitted to the reduction gear, the feeling of reaction force transmitted to the steering wheel can be constantly maintained.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
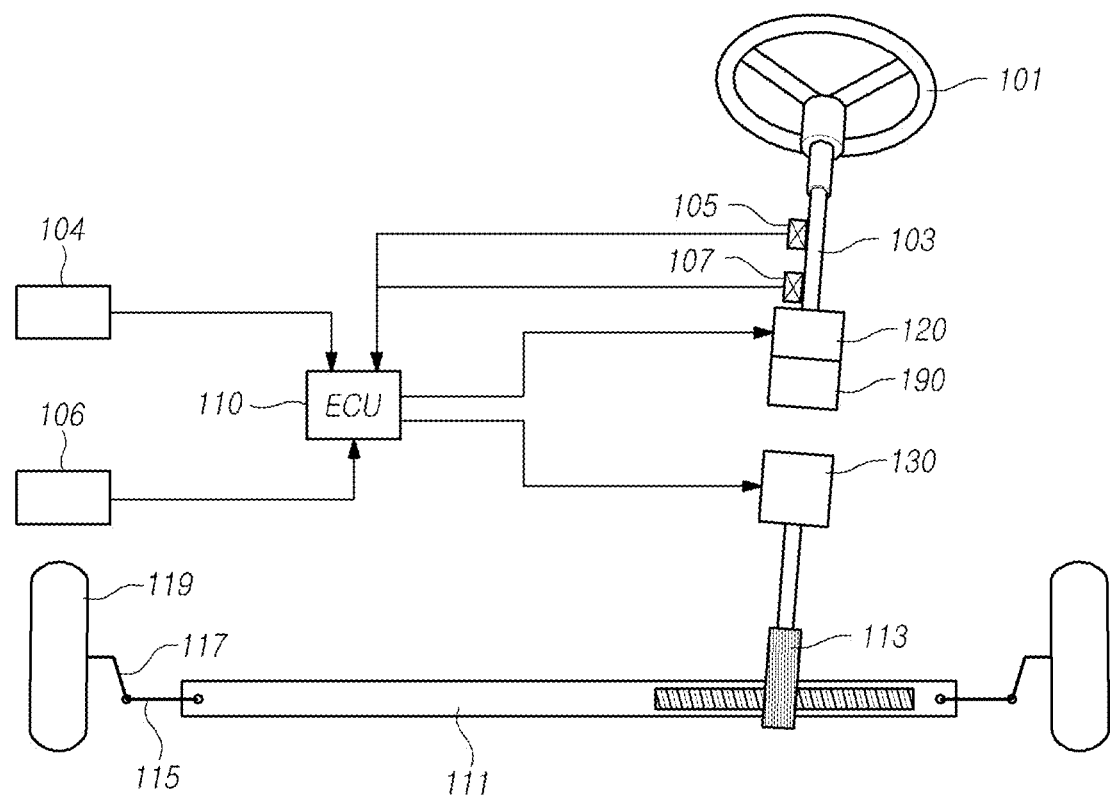
FIG. 1 is a schematic view illustrating a steer by wire type steering apparatus according to the embodiments of the present disclosure.
Figure 2:
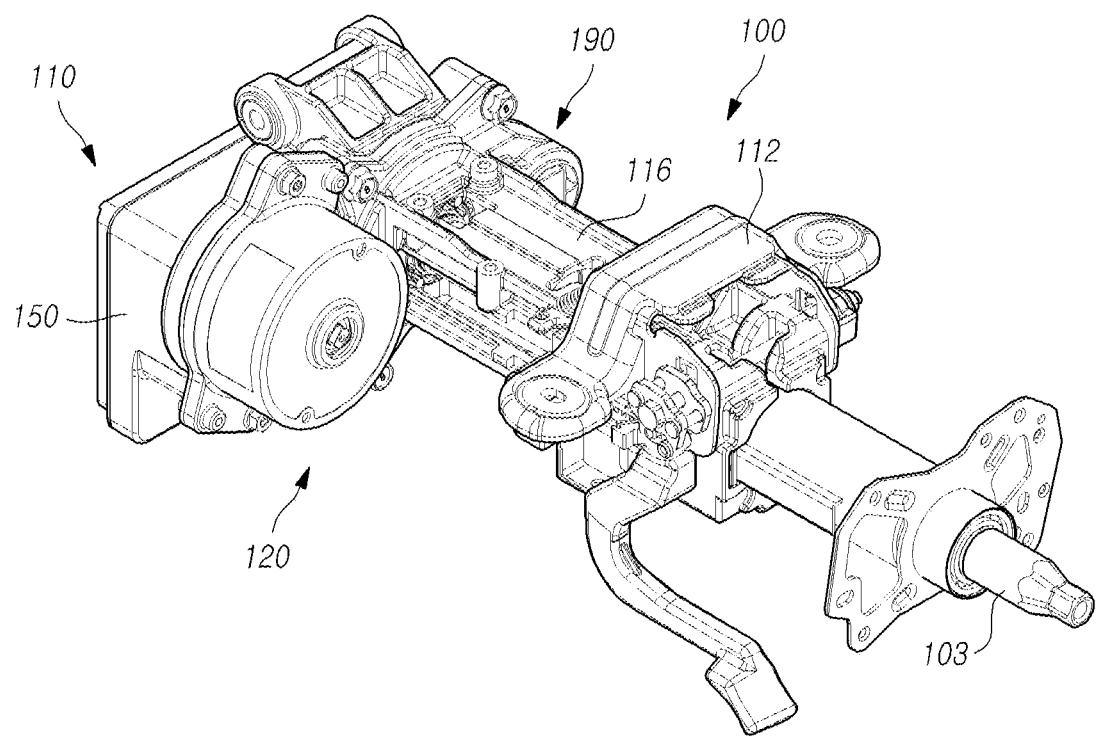
FIGS. 2 to 5 are perspective views illustrating a steer by wire type steering apparatus according to the embodiments of the present disclosure.
Figure 3:
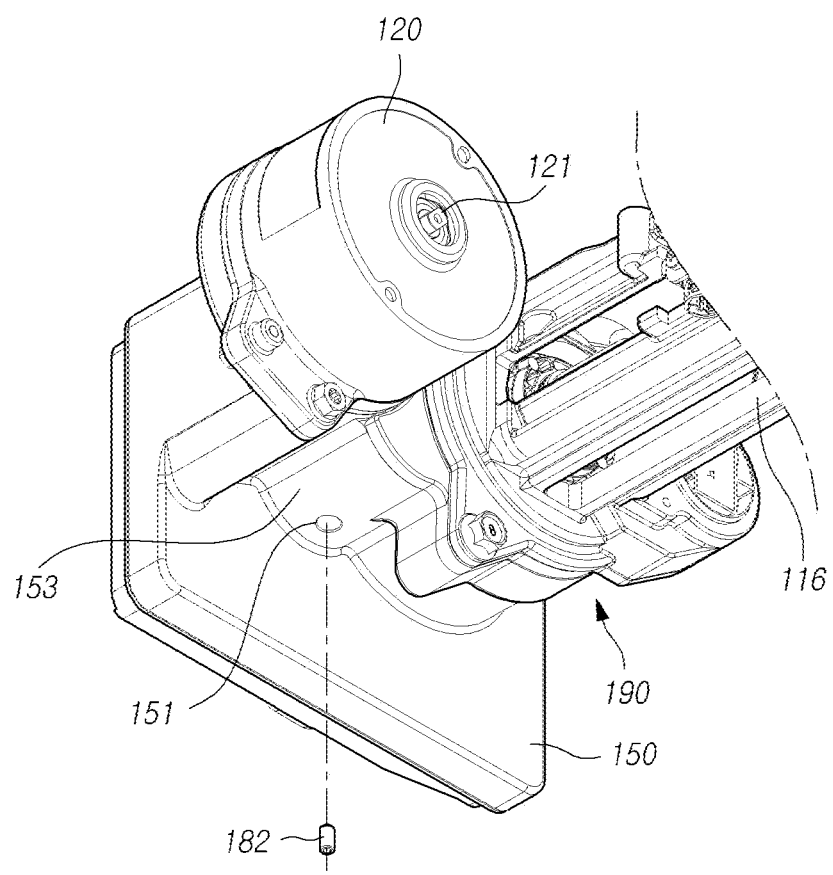
Figure 4:
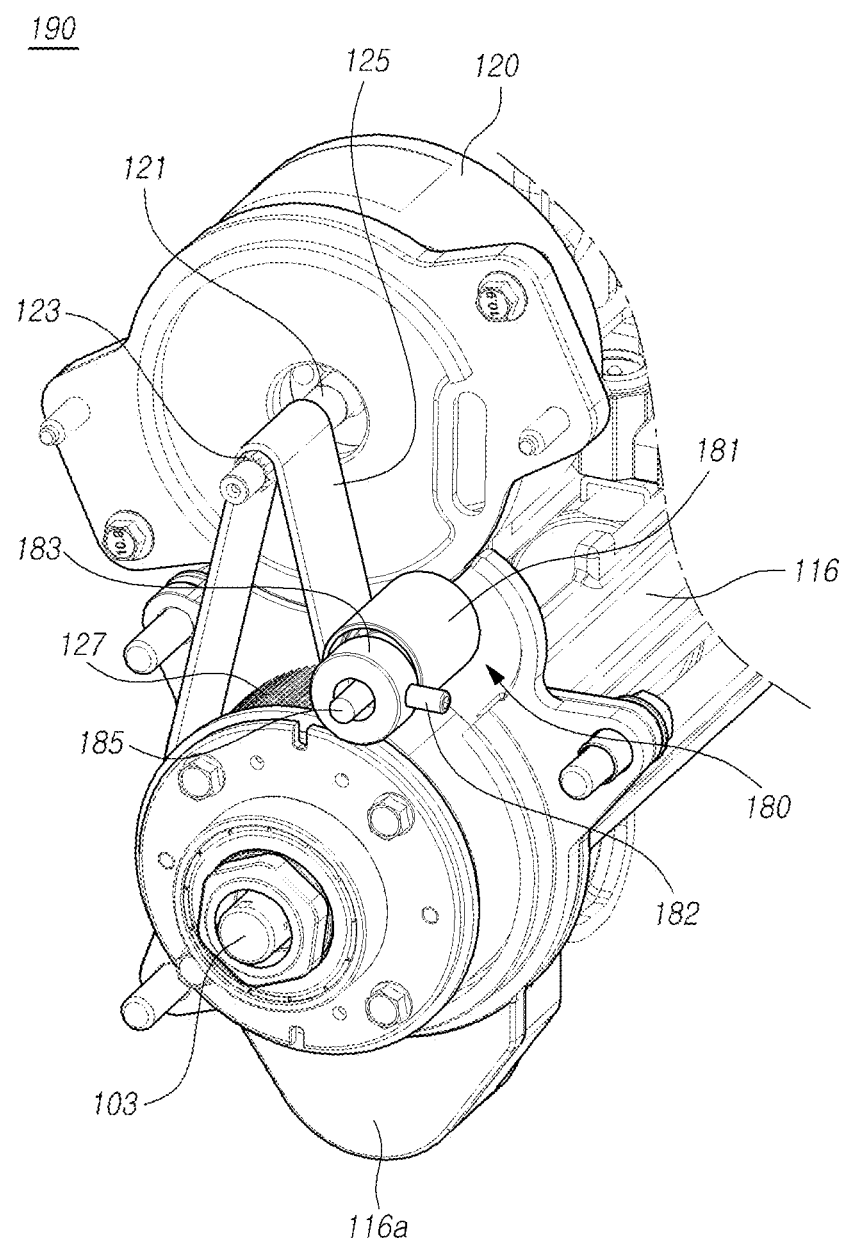
Figure 5:
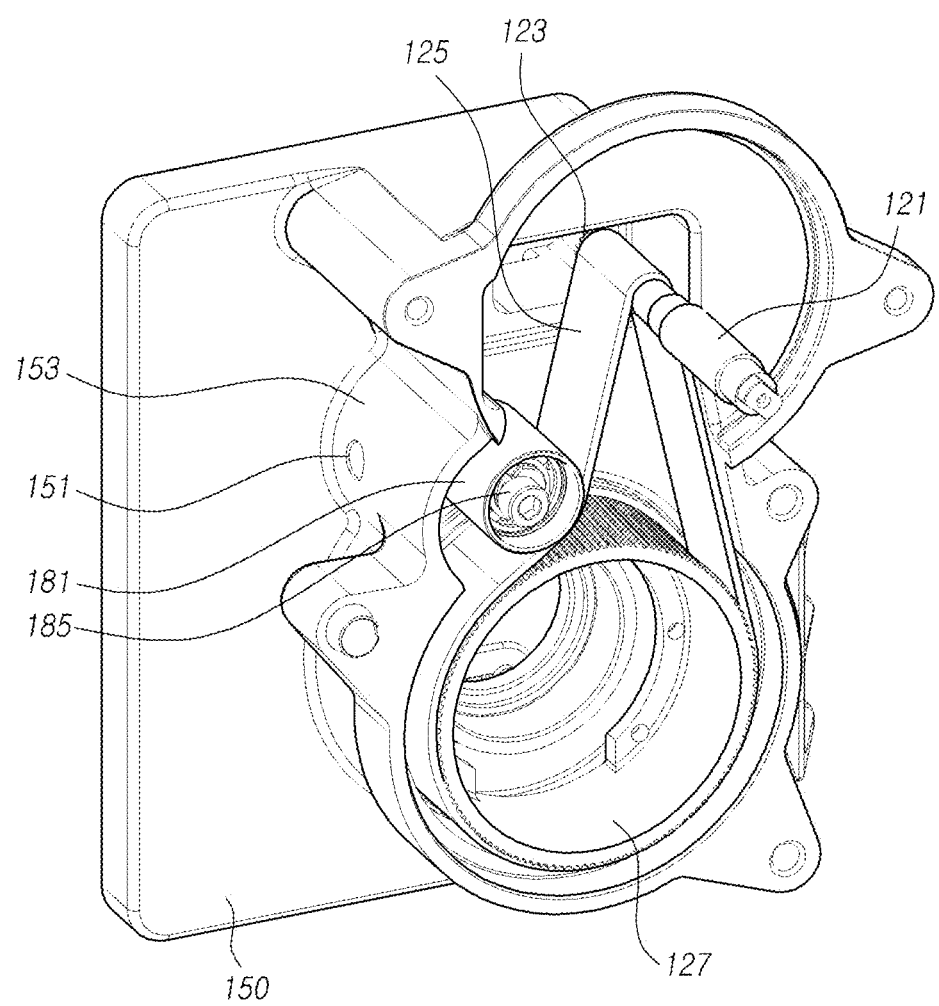

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 6:
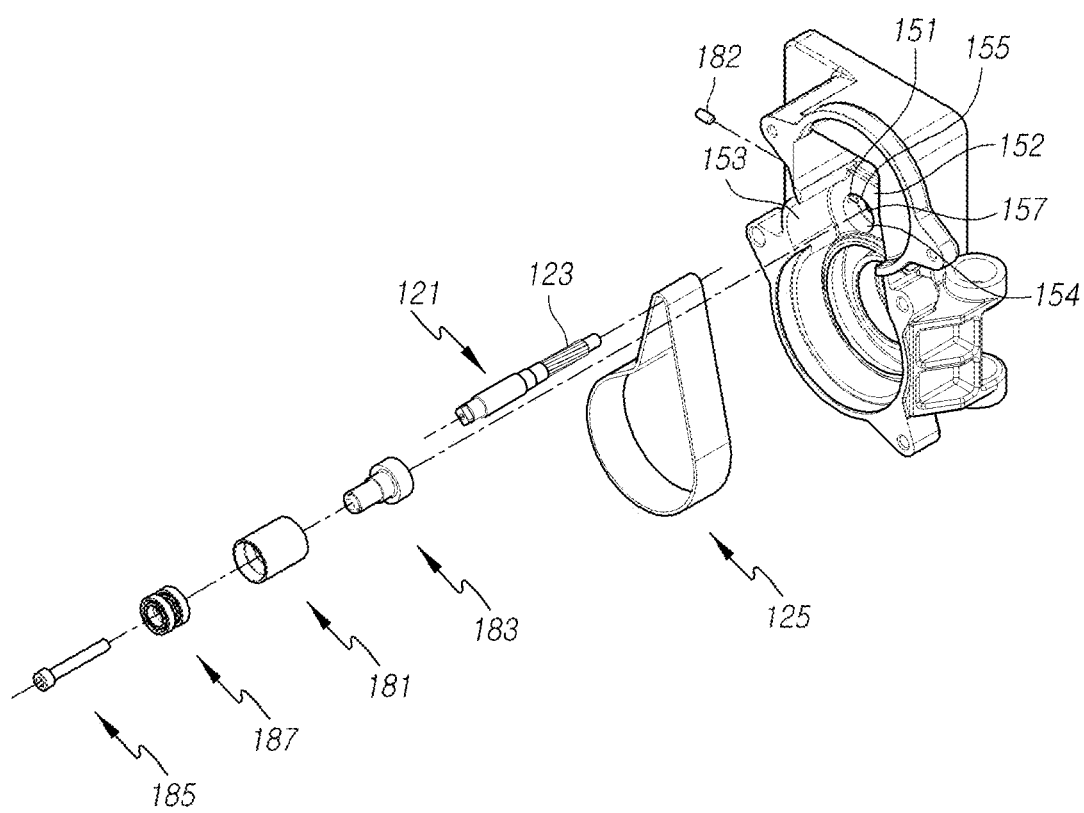
FIGS. 6 and 7 are exploded perspective views illustrating a steer by wire type steering apparatus according to the embodiments of the present disclosure.
Figure 7:
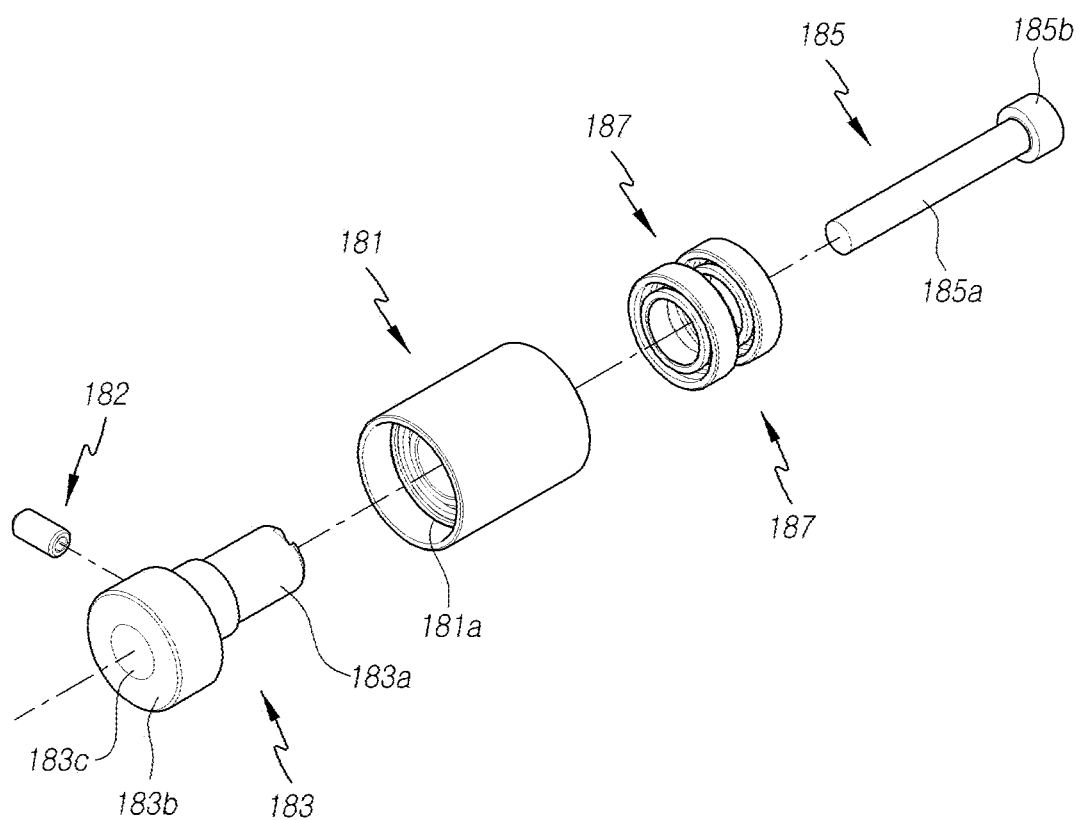
Figure 8:
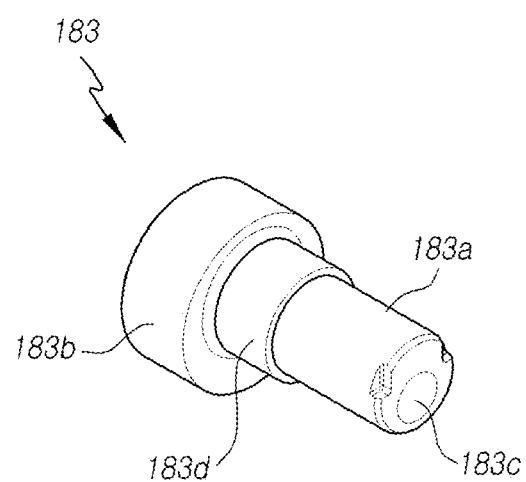
FIG. 8 is a perspective view illustrating a steer by wire type steering apparatus according to the embodiments of the present disclosure.
Figure 9:
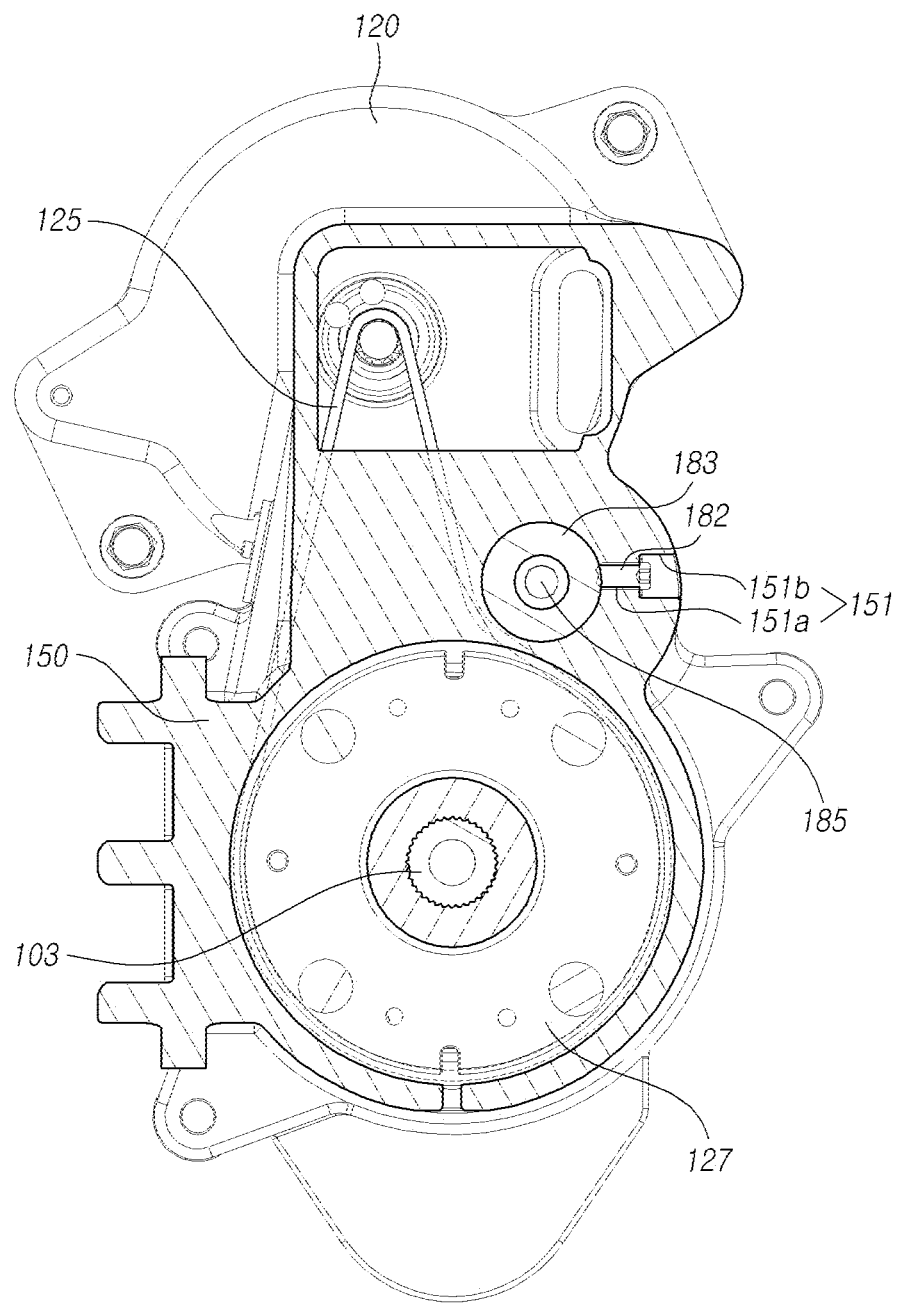
FIG. 9 is a cross-sectional view illustrating a steer by wire type steering apparatus according to the embodiments of the present disclosure.
Figure 10:
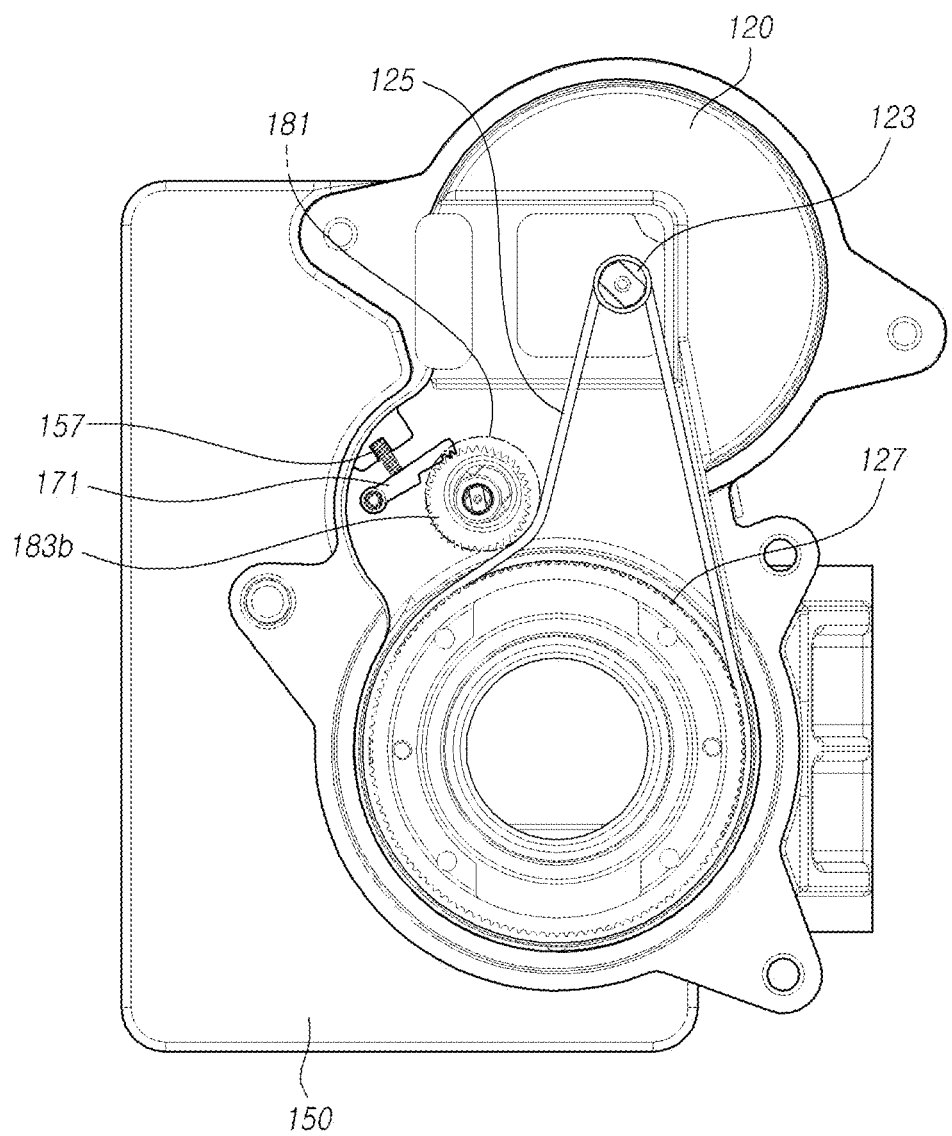
FIGS. 10 and 11 are front views illustrating a steer by wire type steering apparatus according to the embodiments of the present disclosure.
Figure 11:
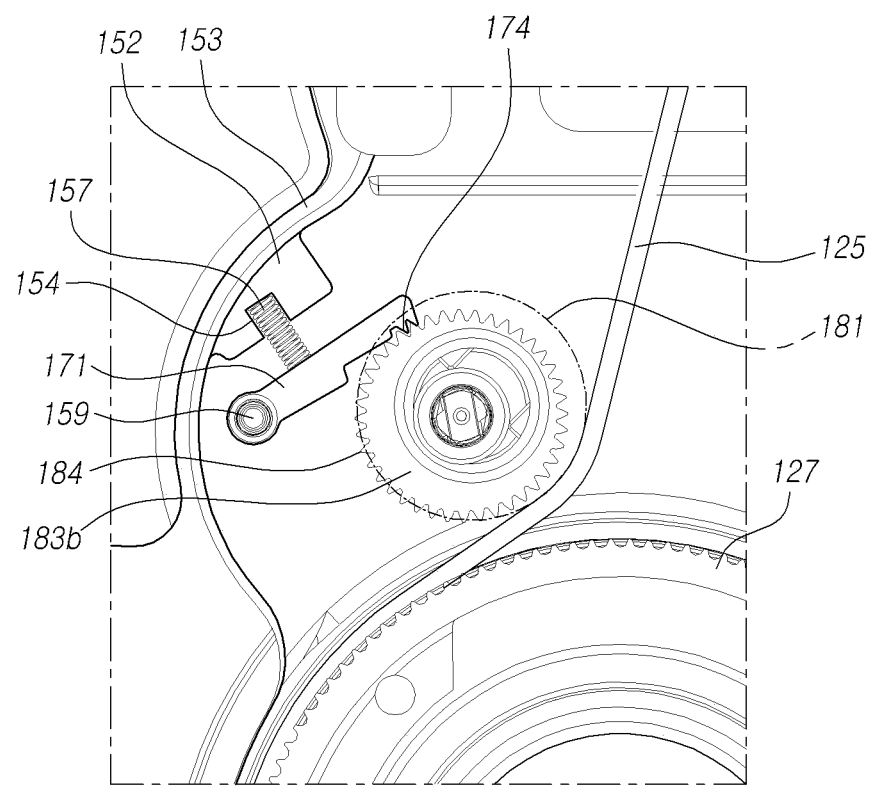

FIG. 1 is a schematic view illustrating a steer by wire type steering apparatus according to the embodiments of the present disclosure. FIGS. 2 to 5 are perspective views illustrating a steer by wire type steering apparatus according to the embodiments of the present disclosure. FIGS. 6 and 7 are exploded perspective views illustrating a steer by wire type steering apparatus according to the embodiments of the present disclosure. FIG. 8 is a perspective view illustrating a steer by wire type steering apparatus according to the embodiments of the present disclosure. FIG. 9 is a cross-sectional view illustrating a steer by wire type steering apparatus according to the embodiments of the present disclosure. FIGS. 10 and 11 are front views illustrating a steer by wire type steering apparatus according to the embodiments of the present disclosure.

Referring to FIGS. 1 to 11, a steer by wire type steering apparatus according to the embodiments of the present disclosure may include a steering shaft 103 coupled to a steering wheel 101 to rotate, a steering sensor 105 and 107 for detecting a rotation direction of the steering shaft 103, an electronic controller 110 for operating a steering motor 120 in forward and reverse directions according to the rotation direction sensed by the steering sensor 105 and 107, a first pulley 123 provided on a shaft 121 of the steering motor 120, a second pulley 127 provided on the steering shaft 103, a driving belt 125 coupled to the first pulley 123 and the second pulley 127, and a belt support member 180 that rotationally supports one side of the driving belt 125 and is coupled to a reduction gear housing 150.

In the steer by wire type steering apparatus according to embodiments of the present disclosure, an angle sensor 105 and a torque sensor 107 are combined as steering sensors for sensing the rotation direction of the steering shaft 103 on one side of the steering shaft 103 connected to the steering wheel 101, when the driver manipulates the steering wheel 101, the angle sensor 105 and the torque sensor 107 that sense it send an electric signal to the electronic controller 110 to operate the steering motor 120 and the pinion motor 130.

The electronic controller 110 controls the steering motor 120 and the pinion motor 130 based on the electrical signals transmitted from the angle sensor 105 and the torque sensor 107 and the electrical signals transmitted from other sensors mounted on the vehicle.

The steering motor 120 is connected to a speed reduction gear 135 for reducing the number of revolutions of the steering motor 120, and provides a reaction force to the steering shaft 103 so as to feel a steering reaction force in the opposite direction when the driver operates the steering wheel 101 during normal driving. And during autonomous driving, steering is performed by the control of the electronic controller 110 without the driver's will.

The pinion motor 130 slides the rack bar 111 connected to the pinion shaft 113 to steer the vehicle wheels 119 on both sides through the tie rod 115 and the knuckle arm 117.

However, in the drawings in the embodiments of the present disclosure, for convenience of explanation, the angle sensor 105 and the torque sensor 107, a vehicle speed sensor 104 for transmitting steering information to the electronic control device 110, and a wheel rotation angle sensor 106 are illustrated as an example, but a motor position sensor, various radars, lidar, and image sensors such as cameras may be provided, and a detailed description thereof will be omitted below.

In such a steer by wire type steering apparatus, since the steering shaft 103 and the pinion shaft 113 are not mechanically connected and the driver's steering wheel 101 operation force is significantly reduced compared to a general steering device, there is a need for a mechanical device that eliminates the sense of heterogeneity felt by the driver and provides steering stability at high speeds.

Accordingly, the steering motor 120 adjusts the driver's steering wheel operation force by applying a rotational force in the opposite direction to the driver's steering will, that is, in the opposite direction to the direction in which the steering shaft 103 rotates.

As the steering sensors 105 and 107 for detecting the rotation direction of the steering shaft 103, the angle sensor 105 and the torque sensor 107 are used as described above. The electronic controller 110 operates the steering motor 120 in forward and reverse directions according to the rotation direction sensed by the steering sensors 105 and 107.

The speed reduction gear 190 for reducing the rotation speed of the steering motor 120 includes a first pulley 123 provided on a shaft 121 of the steering motor 120, and a second pulley 127 provided on the steering shaft 103, and a driving belt 125 coupled to the first pulley 123 and the second pulley 127.

And, a belt support member 180 is provided which rotates and supports one side of the driving belt 125 and is coupled to the reduction gear housing 150. Accordingly, the driving belt 125 is assembled to match the tension of the driving belt 125 when assembling the driving belt 125 and the tension of the driving belt 125 is maintained constant after assembly.

The belt support member 180 is provided in the steering column 100 separated from the pinion shaft 113, the steering column 100 has a column housing 116 in which the steering shaft 103 is built-in. The steering column 100 is provided with a reduction gear housing 150 coupled to a column housing 116 in which the driving belt 125, the first pulley 123, the second pulley 127, and the like are built-in, the steering motor 120, the electronic controller 110 coupled to the reduction gear housing 150 and electrically connected to the steering motor 120, a mounting bracket 112 for being fixed to the vehicle body.

The belt support member 180 includes a rotating member 181 supported on one side of the driving belt 125 and having a cylindrical shape, a bearing 187 supported on an inner circumferential surface of the rotating member 181, a support shaft 183 coupled to an inner side of the bearing 187, and a fixing member 185 coupled to the reduction gear housing 150 through the support shaft 183.

The support shaft 183 includes a bearing coupling portion 183*a* to which the bearing 187 is coupled to an outer circumferential surface, and an eccentric support portion 183*b* having a central axis biased toward one side in a radial direction from a central axis of the bearing coupling portion 183*a* and having an outer diameter different from an outer diameter of the bearing coupling portion 183*a*.

Therefore, when the support shaft 183 is rotated with respect to the central axis of the eccentric support portion 183*b*, the rotation member 181 coaxially coupled to the bearing coupling portion 183*a* is movable in a direction closer to or away from the drive belt 125.

The bearing support portion 183*d* is provided between the bearing coupling portion 183*a* and the eccentric support portion 183*b*, and the bearing support portion 183*d* is formed by a stepped outer diameter on the outer peripheral surface of the bearing coupling portion 183*a*. Then, the inner race of the bearing 187 is supported and coupled to the stepped portion connected between the bearing coupling portion 183*a* and the bearing support portion 183*d*. The inner circumferential surface of the rotating member 181 is provided with a stepped portion 181*a* to which the outer race of the bearing 187 is supported and coupled.

The belt support member 180 includes a support member 182 that supports one side of the eccentric support portion 183*b* and supports the rotating member 181 toward the driving belt 125.

The support member 182 is screwed to the reduction gear housing 150 and supports one side of the outer peripheral surface of the eccentric support portion 183*b* to fix the position of the support shaft 183. Accordingly, the rotating member 181 maintains a constant force for supporting the driving belt 125.

The support shaft 183 is provided with a through hole 183*c* passing through an inside of the support shaft 183 along the central axis of the eccentric support portion 183*b*, and the fixing member 185 is inserted into the through hole 183*c*.

Accordingly, the operator adjusts the tension of the driving belt 125 while rotating the support shaft 183 in a state in which the fixing member 185 is not completely fastened when assembling the support shaft 183. Thereafter, the tension of the driving belt 125 is maintained by completely fastening the fixing member 185 and screwing the supporting member 182 to the reduction gear housing 150.

And an insertion groove 155 into which the eccentric support portion 183*b* is inserted is provided in the reduction gear housing 150, and a guide hole 151 into which the support member 182 is inserted is provided on a side surface of the insertion groove 155.

The insertion groove 155 is formed to have the same diameter as the eccentric support portion 183*b*, so that the eccentric support portion 183*b* is supported by the insertion groove 155 and rotates during assembly. Then the support member 182 supports the eccentric support portion 183*b* and is fixed to the guide hole 151.

In addition, the reduction gear housing 150 is provided with a fixing hole 157 to which the fixing member 185 is coupled to the bottom of the insertion groove 155, so that the fixing member 185 is fastened to the fixing hole 157 to fix the support shaft 183.

The fixing member 185 includes a coupling portion 185*a* inserted into the through hole 183*c* and coupled to the fixing hole 157, and a shaft support portion 185*b* having an enlarged diameter at one end of the coupling portion 185*a* and supporting the bearing coupling portion 183*a* of the support shaft 183 in an axial direction. And the fixing member 185 supports and fixes the support shaft 183 in the axial direction.

The guide hole 151 formed in the reduction gear housing 150 includes an inner hole 151*a* into which a body portion of the support member 182 is inserted and screwed, and an outer hole 151*b* having an inner diameter larger than that of the inner hole 151*a* and in which a head portion of the support member 182 is located.

In addition, as shown in FIGS. 10 and 11, the belt support member 180 includes a rotation preventing member 170 coupled to an outer circumferential surface of the eccentric support portion 183*b* to prevent rotation of the support shaft 183.

Here, the rotation preventing member 170 includes a locking member 171 having a fixing protrusion 174 coupled to an outer circumferential surface of the eccentric support portion 183*b* at one end and rotatably coupled to the reduction gear housing 150 at an other end, and an elastic member 157 having one end supported by the reduction gear housing 150 and an other end supported by the locking member 171 to support the locking member 171 toward the eccentric support portion 183*b*.

In addition, a coupling protrusion 184 engaged with the fixing protrusion 174 of the locking member 171 may be formed on the outer circumferential surface of the eccentric support portion 183*b*, and the other end of the locking member 171 is coupled to the reduction gear housing 150 by a hinge 159.

Accordingly, the operator adjusts the tension of the driving belt 125 while rotating the support shaft 183, and then completely fastens the fixing member 185. And, by coupling the fixing protrusion 174 of the locking member 171 to the coupling protrusion 184 of the eccentric support portion 183*b*, the support shaft 183 is not rotated and maintains its original position.

In addition, a protruding bulkhead 152 may be provided inside the reduction gear housing 150, a support groove 154 in which the elastic member 157 is inserted and supported is provided in the protruding bulkhead 152. Accordingly, the separation of the elastic member 157 is prevented.

As described above, according to the embodiments of the present disclosure, there is provided a steer by wire type steering apparatus capable of providing an accurate feeling of reaction force to the driver and maintain a constant feeling of reaction force transmitted to the steering wheel even when a high load is transmitted to the reduction gear.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer by wire type steering apparatus comprising:
a steering shaft coupled to a steering wheel to rotate;
a steering sensor for detecting a rotation direction of the steering shaft;
an electronic controller for operating a steering motor in forward and reverse directions according to the rotation direction sensed by the steering sensor;
a first pulley provided on a shaft of the steering motor;
a second pulley provided on the steering shaft;
a driving belt coupled to the first pulley and the second pulley; and
a belt support member that rotationally supports one side of the driving belt and is coupled to a reduction gear housing,
wherein the belt support member comprises:
a rotating member supported on one side of the driving belt and having a cylindrical shape;
a bearing supported on an inner circumferential surface of the rotating member;
a support shaft coupled to an inner side of the bearing; and
a fixing member coupled to the reduction gear housing through the support shaft,
wherein the support shaft comprises:
a bearing coupling portion to which the bearing is coupled to an outer circumferential surface; and
an eccentric support portion having a central axis biased toward one side in a radial direction from a central axis of the bearing coupling portion and having an outer diameter different from an outer diameter of the bearing coupling portion, and
wherein the belt support member comprises a support member that supports one side of the eccentric support portion and supports the rotating member toward the driving belt.

2. The steer by wire type steering apparatus of claim 1, wherein the support shaft is provided with a through hole passing through an inside of the support shaft along the central axis of the eccentric support portion, and the fixing member is inserted into the through hole.

3. The steer by wire type steering apparatus of claim 2, wherein an insertion groove into which the eccentric support portion is inserted is provided in the reduction gear housing, and a guide hole into which the support member is inserted is provided on a side surface of the insertion groove.

4. The steer by wire type steering apparatus of claim 3, wherein the reduction gear housing is provided with a fixing hole on a bottom of the insertion groove, and the fixing member is coupled to the fixing hole.

5. The steer by wire type steering apparatus of claim 4, wherein the fixing member comprises:
a coupling portion inserted into the through hole and coupled to the fixing hole; and
a shaft support portion having an enlarged diameter at one end of the coupling portion and supporting the bearing coupling portion of the support shaft in an axial direction.

6. The steer by wire type steering apparatus of claim 3, wherein the guide hole comprises:
an inner hole into which a body portion of the support member is inserted and screwed; and
an outer hole having an inner diameter larger than that of the inner hole and in which a head portion of the support member is located.

7. The steer by wire type steering apparatus of claim 1, wherein the belt support member comprises a rotation preventing member coupled to an outer circumferential surface of the eccentric support portion to prevent rotation of the support shaft.

8. The steer by wire type steering apparatus of claim 7, wherein the rotation preventing member comprises:
a locking member having a fixing protrusion coupled to an outer circumferential surface of the eccentric support portion at one end and rotatably coupled to the reduction gear housing at an other end; and
an elastic member having one end supported by the reduction gear housing and an other end supported by the locking member to support the locking member toward the eccentric support portion.

9. The steer by wire type steering apparatus of claim 8, wherein a coupling protrusion engaged with the fixing protrusion is formed on the outer circumferential surface of the eccentric support portion.

10. The steer by wire type steering apparatus of claim 9, wherein the other end of the locking member is coupled to the reduction gear housing by a hinge.

11. The steer by wire type steering apparatus of claim 9, wherein a protruding bulkhead is provided inside the reduction gear housing and a support groove in which the elastic member is inserted and supported is provided in the protruding bulkhead.

* * * * *